US009779301B2

(12) United States Patent
Herz

(10) Patent No.: US 9,779,301 B2
(45) Date of Patent: Oct. 3, 2017

(54) METHOD FOR PROVIDING IMAGING SATELLITE OPPORTUNITY NOTIFICATIONS ON A MOBILE DEVICE

(71) Applicant: Orbit Logic, Inc., Greenbelt, MD (US)

(72) Inventor: Alexander Herz, Washington, DC (US)

(73) Assignee: Orbit Logic, Inc., Greenbelt, MD (US)

( * ) Notice: Subject to any disclaimer, the term of this patent is extended or adjusted under 35 U.S.C. 154(b) by 6 days.

(21) Appl. No.: 15/130,310

(22) Filed: Apr. 15, 2016

(65) Prior Publication Data

US 2016/0232400 A1    Aug. 11, 2016

Related U.S. Application Data

(63) Continuation of application No. 14/630,807, filed on Feb. 25, 2015, now Pat. No. 9,344,994.

(60) Provisional application No. 61/947,941, filed on Mar. 4, 2014.

(51) Int. Cl.

| | |
|---|---|
| *G06K 9/00* | (2006.01) |
| *H04W 68/00* | (2009.01) |
| *H04M 1/725* | (2006.01) |
| *H04W 4/02* | (2009.01) |
| *G06Q 30/06* | (2012.01) |
| *G06F 17/30* | (2006.01) |

(52) U.S. Cl.
CPC ....... *G06K 9/0063* (2013.01); *G06F 17/3028* (2013.01); *G06Q 30/0601* (2013.01); *G06Q 30/0643* (2013.01); *H04M 1/72522* (2013.01); *H04M 1/72572* (2013.01); *H04W 4/021* (2013.01); *H04W 4/028* (2013.01); *H04W 68/00* (2013.01)

(58) Field of Classification Search
CPC ... H04W 68/00; H04W 4/021; G06F 17/3028; H04M 1/72522; G06Q 30/0601; H04N 5/44
See application file for complete search history.

(56) References Cited

U.S. PATENT DOCUMENTS

| | | |
|---|---|---|
| 2014/0162560 A1 | 6/2014 | Ye et al. |
| 2015/0094031 A1 | 4/2015 | Liu |

OTHER PUBLICATIONS

"Sibyl Mobile App". Retrieved from http://orbitlogic.com/products/sibyl.php on Oct. 21, 2016.*
"The AGI Source Book for Geographic Information Systems 1996", Published by Association for Geographic Information, 1995, 3 pages.

(Continued)

*Primary Examiner* — Nathan Mitchell
(74) *Attorney, Agent, or Firm* — Crowell & Moring LLP

(57) ABSTRACT

A mobile device application and process provides real-time notifications to a user whenever imaging satellites are positioned in the vicinity of the user, such that the imaging satellite is in a position to capture imagery of the user's location or a user-specified location. The user may access and purchase, via the mobile device application, available satellite imagery. In certain embodiments, the user may also be provided with the opportunity to issue, via the mobile device, a satellite tasking request such that a satellite will be tasked to capture imagery of a specific location.

17 Claims, 6 Drawing Sheets

(56) References Cited

OTHER PUBLICATIONS

"Buying Optical Satellite Imagery? The Top 10 Things to Consider", Hubing, http://web.archive.org/web/2012111092555/http://www.landinfo.com/buying-optical-satellite-imagery.html, Nov. 2012, 2 pages.

"SatCam", Mooney, http://cimss.ssec.wisc.edu/education/cla/SatCamAugsut2012_Mooney.pdf, Aug. 2012, 19 pages.

"Press Release: Orbit Logic is Going Mobile: The Sibyl App: Task an Imaging Satellite from a handheld device.", http://www.orbitlogic.com/news/pr1011_Sibyl_PR.php, Oct. 2011, 1 page.

Sybil Datasheet, http://www.orbitlogic.com/products/Sibyl%20Datasheet%202012.pdf, 2012, 2 pages.

\* cited by examiner

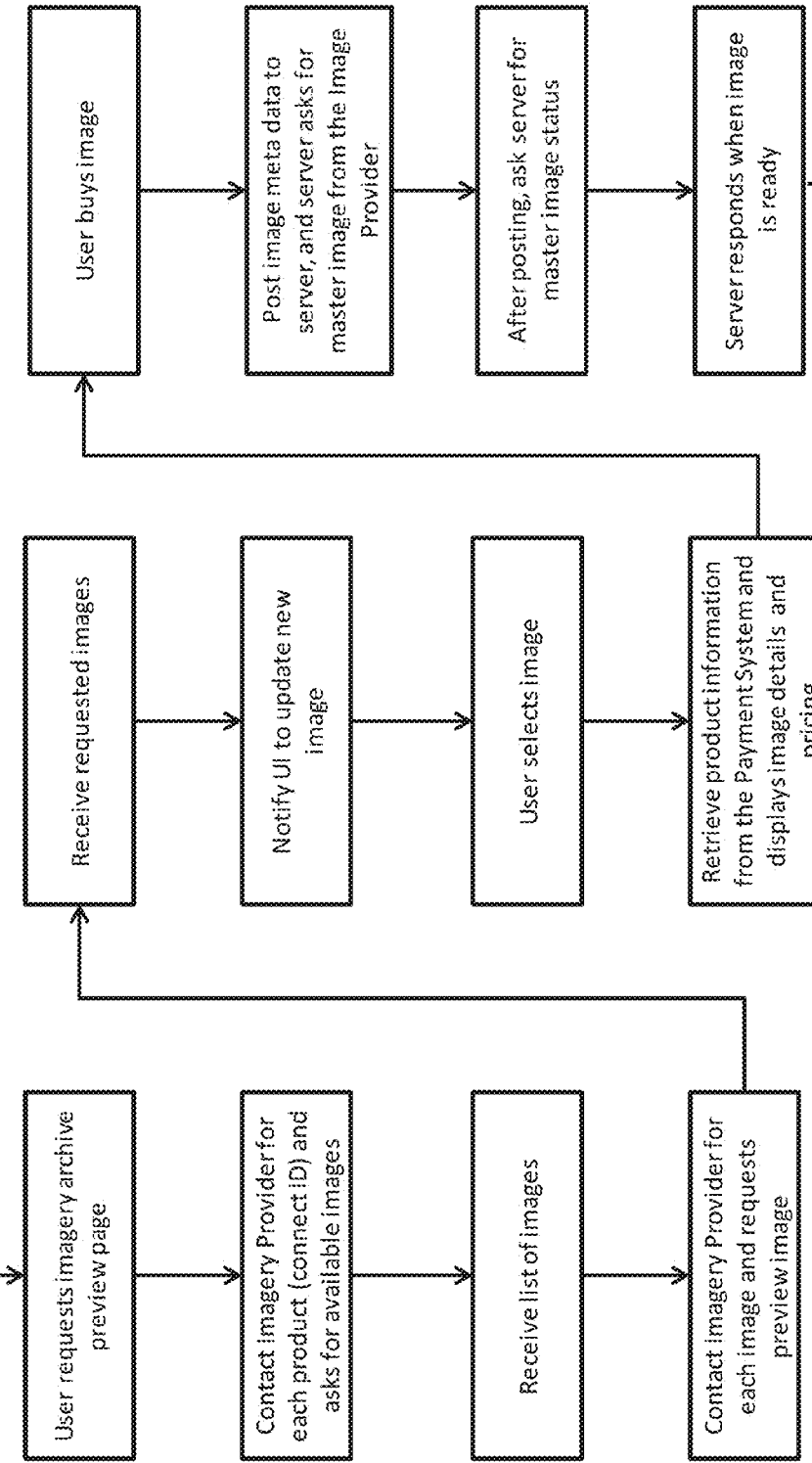

METHOD FOR PROVIDING IMAGING SATELLITE OPPORTUNITY NOTIFICATIONS ON A MOBILE DEVICE

CROSS-REFERENCE TO RELATED APPLICATION

This application is a continuation of U.S. application Ser. No. 14/630,807, filed Feb. 25, 2015, which claims the benefit of U.S. Provisional Application No. 61/947,941, filed Mar. 4, 2014.

FIELD OF THE INVENTION

The present invention relates to providing real-time imaging satellite opportunity notifications on a mobile device, as well as enabling mobile access to purchase satellite imagery and to request new tasking.

BACKGROUND

Applications and processes currently exist for users to determine when satellites may be flying overhead, the general location of satellites in orbit, and even to inform users when satellites flying overhead may be viewable from the ground.

However, there is currently no known approach for notifying users as to when a given satellite will be able to see them. In addition, unlike existing applications used for satellite imaging feasibility and planning by satellite operators, there is no known approach for providing real-time notifications and alerts to the user. It would be particularly advantageous to have such information since it would provide situational awareness to the user, as well as provide an opportunity to identify in real-time opportunities to obtain satellite imagery of certain locations, whether by purchase or otherwise.

As such, there is a desire in the art for a method of providing, on a mobile device, real-time notifications of satellite imaging opportunities, along with the ability to purchase or request new image tasking using a mobile device.

BRIEF SUMMARY OF THE INVENTION

Disclosed and claimed herein is a method and electronic mobile device for providing real-time imaging satellite opportunity notifications on a mobile device, in one embodiment, the method includes receiving, by a user interface of the mobile device, a user image request to capture satellite imagery of a user-defined location, and then transmitting, to a support server over a wireless network connection, information corresponding to the user image request. The method further includes receiving, by the mobile device from the support server, satellite state information corresponding to one or more satellites, and then calculating, using the satellite state information, one or more time periods during which the one or more satellites will be capable of capturing satellite imagery of the user-defined location. Finally, the method includes providing a user notification corresponding to at least one of the one or more time periods during which the one or more satellites will be capable of capturing satellite imagery of the user-defined location Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 4A-4B illustrates a flow diagram of one embodiment of a process by which a user can purchase specific satellite imagery using a mobile device application.

DETAILED DESCRIPTION OF EXEMPLARY EMBODIMENTS

Overview of the Disclosure

Figure 1:
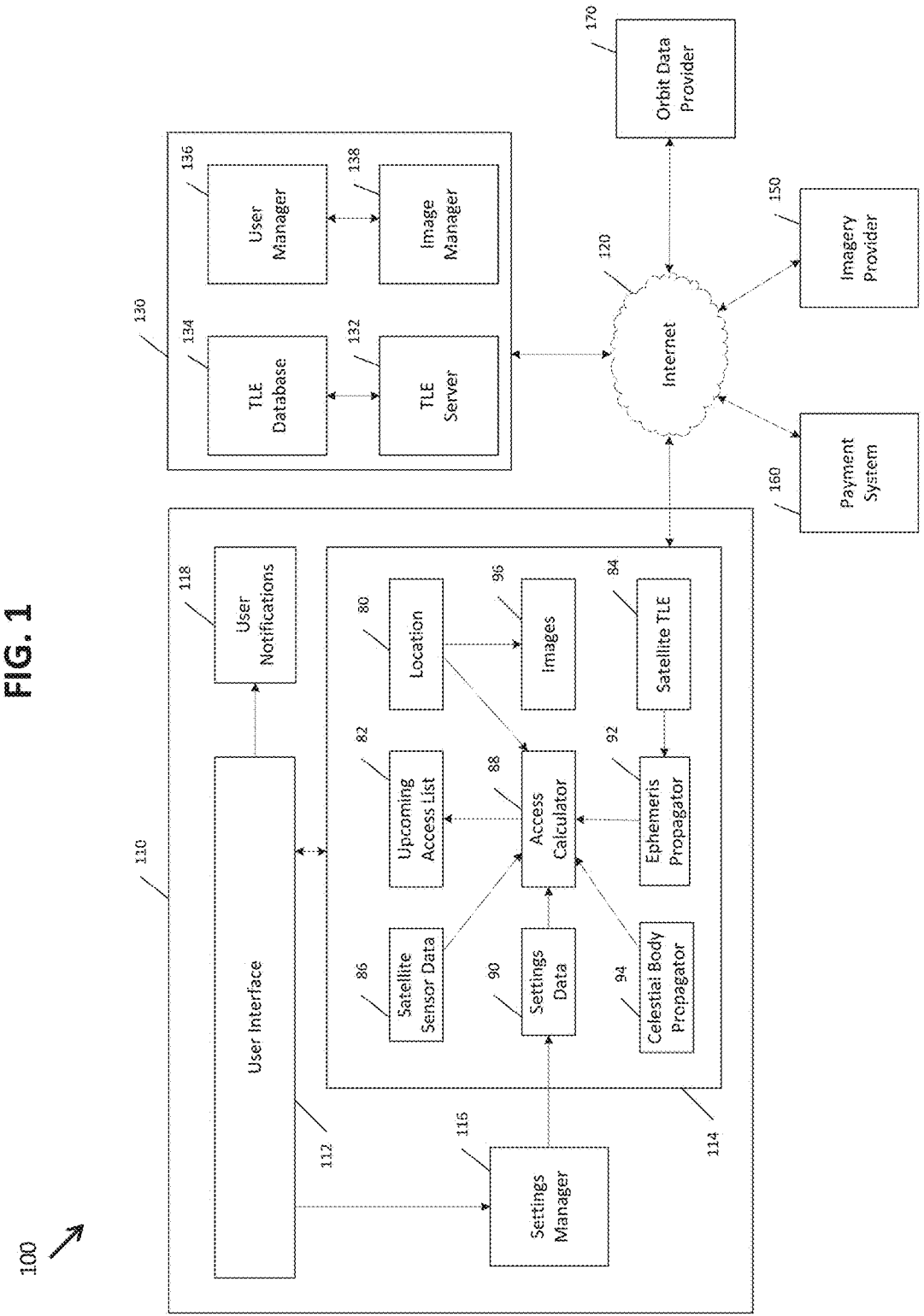
FIG. 1 is a simplified diagram of a system configured to implement one or more aspects of the invention.

The following disclosure relates to a process, which can be carried out on a mobile device such as a smartphone or tablet, in which real-time notifications may be provided to a user whenever imaging satellites are positioned in the vicinity of the user (i.e., overhead of the user's location), such that the imaging satellite is in a position to capture imagery of the user's location or a user-specified location.

Another aspect of the invention is to provide the user access, via the mobile device, to preview and/or purchase available satellite imagery.

In certain embodiments, the user may also be provided with the opportunity to issue, via the mobile device, a satellite tasking request such that a satellite will be tasked to capture imagery of a specific location.

It should be appreciated that all references herein to a "mobile device" encompass mobile devices, such as smartphones and tablets, operating individually, as well as mobile devices operating in communication with one or more secondary electronic devices, such as so-called smartwatches and smartglasses.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data hits are maintained are physical locations that have particular electrical, magnetic, optical, or organic properties corresponding to the data bits.

When implemented in software, the elements of the invention are essentially the code segments to perform the necessary tasks. The code segments can be stored in a processor readable storage medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments of the Invention

As noted above, the present disclosure is directed to a process, which can specifically be carried out by an application program executing on a mobile device (also referred to herein as a "mobile app"), to provide users with real-time notifications (e.g., vibrations, sound alerts, and/or visual on-screen alerts) when imaging satellites are overhead and in a position to take a picture of the user's location.

In certain embodiments, the process carried out by the mobile app may compute and display, on the user's mobile device, satellite imaging opportunities while specifically taking into account one or more of lighting conditions, satellite orbit information, satellite sensor data, atmospheric conditions and other factors.

Referring now to FIG. 1, depicted is one embodiment of a system 100 configured to carry out one or more aspects of the invention. In particular, the system of FIG. 1 comprises a client-side user device 110, such as a smartphone or tablet, which is in wireless communication via an Internet connection 120 with a support server 130.

System 100 may optionally include at least one imagery provider 150 and/or at least one payment system 160. The imagery provider(s) 150 may include commercial satellite operators and other providers of satellite imagery, and may also include operators who can be tasked to collect new images. The payment system 160 may be configured to process image purchase payments and may include entities such as credit card companies or intermediaries, as well as online purchase mechanisms.

The user device 110 further includes, in part, user interface 112, user notifications 118 and settings manager 116. It should of course be appreciated that the user device 110 may preferably be configured with additional, conventional hardware components, including for example, one or more microprocessors, volatile and non-volatile memory, and at least one of a cellular and a data network interface. The user device 110 preferably also includes a mobile operating system, as is generally known in the art.

With respect to the user interface 112, this component may control the display of data to the user via a mobile device screen. Such data may be displayed as graphics, such as maps or 3D globes, text data, and/or audio data for the visually impaired. Such data may similarly be displayed on a secondary electronic device (e.g., smartwatch or smartglasses) that is in communication with the user device 110 (e.g., via a Bluetooth™ connection). Moreover, the user interface 112 may be configured to enable users to view and change user-controlled process settings, such as the desired resolution threshold, etc.

The settings manager component 116 may include software that can influence and even override user process settings, particularly for notifications. The user notification component 118 may comprise a process component that notifies the user of process events, for example, of the impending start of a satellite imaging opportunity, as further described below. The settings manager component 116 works with the mobile device capabilities for visual, audio, and vibration alerts as configured in the process and device settings.

The user device 110 of FIG. 1 further comprises a mobile application and related data 114 ("mobile app 114") which is configured to implement one or more aspects of the invention. It should be appreciated that the mobile app 114 may comprise processor-executable instructions implemented in software (e.g., Objective C, Java, etc.) executing on the user device 110, along with certain associated data.

The mobile app 114 comprises an access calculator 88, which may be configured as a software-based engine that receives and operates on certain data to provide certain outputs. In particular, access calculator 88 may be configured to calculate windows (start and stop times) for imaging opportunities based on satellite state information, such as orbit ephemeris (position and time data for the satellite), target position, camera capabilities and resolution settings, target lighting conditions in conjunction with camera imaging mode capabilities, and other factors.

In this case, access calculator 88 is shown as receiving 'area of interest' information 80, which may specify the location/ground target for imaging opportunity computations in latitude and longitude (or similar) coordinates, as well as settings data 90, which comprises configurable parameter values, some of which may be selected by the user, that affect process computations.

Access calculator 88 also receives satellite sensor data 86, which includes information about the sensor (such as detector pitch and focal length) which may be used to compute imaging opportunities at various levels of resolution based on known information such as satellite position and point-of-interest location.

The mobile app 114 further includes an ephemeris propagator component 92, which is configured to generate a satellite ephemeris (which is a prediction of position over time) for each satellite based on a starting state (generally in the form of a Two-Line-Element (TLE)) and a propagation algorithm such as SGP4. The mobile app 114 also uses a celestial body propagator component 94 to predict the position of the Sun relative to the Earth, and predict the rotation of the Earth, and other relevant celestial object predictions.

Continuing to refer to FIG. 1, the mobile app 114 is configured to connect to the support server 130 via an Internet connection 120, as noted above. In addition, the mobile app 114 may connect to other sources of data and/or satellite imagery or video (e.g., at least one imagery provider 150) either directly via the Internet connection 120 or indirectly via the support server 130.

It should further be appreciated that the mobile app 114 and/or support server 130 may be set up with any desired group of imaging satellites. For example, a public version of the mobile app 114 may include all commercial and unclassified imaging satellites (optical and radar) that have a certain resolution capability, e.g., 5 meters or better. Custom deployments can be used to provide private versions of the app for any imaging satellite constellation to a restricted set of users.

In certain embodiments, the support server 130 may provide updated satellite orbit data at process startup to support imaging opportunity computations. Satellite orbit data may be provided to the mobile app 114 using, for example, a JSON (JavaScript Object Notation) restful interface in TLE format in order to keep the data, bandwidth requirements low. It should, however, be appreciated that the data may be provided in other formats. In certain embodiments, it is preferable that the mobile app 114 does not require a persistent connection to the support server 130 to function. In this fashion, if the mobile app 114 is unable to connect to the server at startup, the mobile app 114 process may use the last orbit data available to compute upcoming imaging opportunities, thereby providing normal functionality from the user's perspective, even though an active network connection may be unavailable.

The Satellite TLE component 84 handles satellite Two-Line-Element orbit data, which specifies the current/latest known orbit state of each satellite. This component preferably receives updated orbit data from support server 130 (obtained from at least one orbit data provider 170), which in turn provides the updated information to the ephemeris propagator component 92, described above.

As shown in FIG. 1, the support server includes a TLE server component 132, which provides updated satellite TLE orbit data to processes running on mobile devices when they have internet connectivity, for example. In addition, this component is preferably configured to retrieve or receive the latest satellite orbit data from one or more orbit data providers 170 (such as NORAD or an intermediary provider) automatically on a recurring basis. The TLE server component 132 is in communication with a TLE database 134, which stores the latest satellite orbit data, generally in the form of TLEs.

Support server 130 further includes a user manager component 136 which is configured to support optional user registration and store relevant user information, such as names, postal addresses, nationality, email addresses, passwords, purchase history, device type and other relevant information. The user manager component 136 may use such information, at least in part, to adhere to U.S. laws, including embargo and denied party restrictions.

Support server 130 is further depicted in FIG. 1 as including an image manager component 138 which may be configured to store registered users' purchased images using, for example, cloud storage methods, while associating each purchased image with a registered user account, when appropriate. This component may also support the re-downloading of images to a registered user's device upon request.

Based on the various processes and data described above, the access calculator 88 of the mobile app 114 generates an upcoming access list 82, which identifies future imaging opportunities, and provides the list 82 to the user interface 112 for presentation to the user, via either a display screen or audio output of the user device 110. In certain embodiments, when generating the upcoming access list 82, the mobile app 114 may further be configured to account for cloud forecast and/or current cloud cover and/or atmospheric conditions that affect certain types of satellite imaging.

Figure 2C:
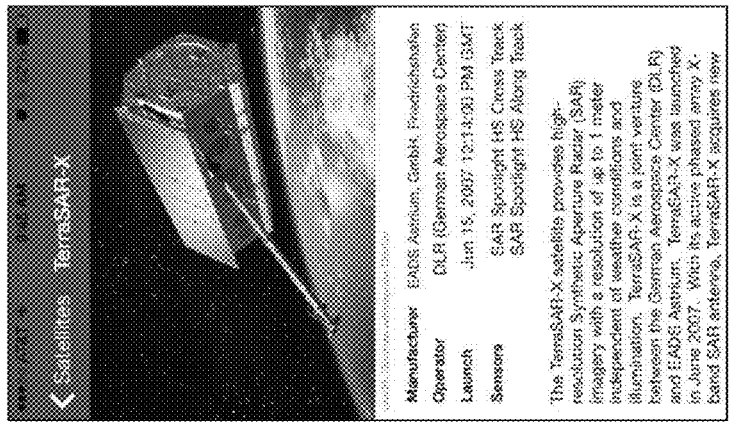
FIGS. 2A-2C depict various screenshots of a mobile device display screen depicting certain features of one or more embodiments of the invention.
Figure 2B:
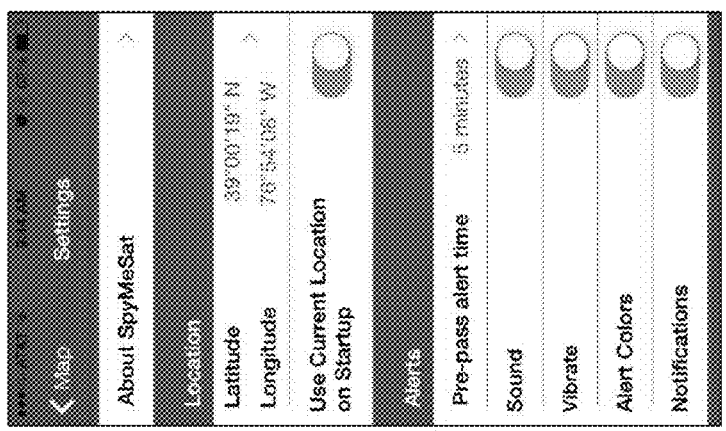
Figure 2A:
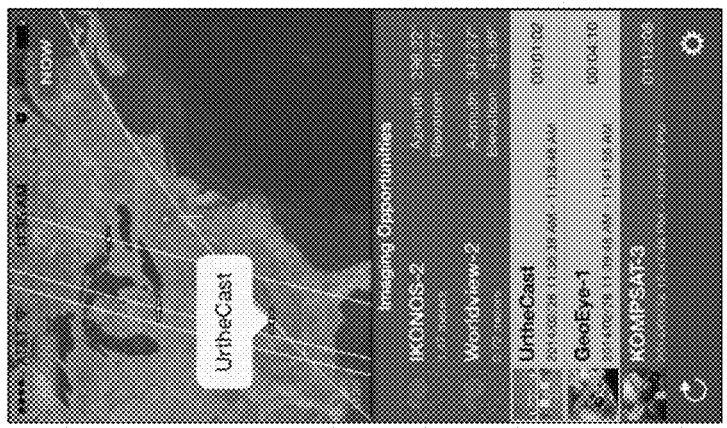

Referring now to FIG. 2A, depicted is one embodiment of a display screen on a user device (e.g., user device 110). In this embodiment, the display screen contains the upcoming access list 82 described above. A countdown may be provided for each computed future imaging opportunity. During the user notification period, the satellite ground track may be displayed on a map or 3D globe view. The satellite position may be displayed dynamically on the map or globe as it moves along its orbit in real-time, as shown in FIG. 2A. Moreover, imaging opportunity start and stop times may be displayed, and during the imaging opportunity, the position of the satellite and the instantaneous potential resolution of any images may be dynamically displayed.

The mobile app 114 may also provide, via a display screen of the user device, various configuration controls to the user, as shown in FIG. 2B. Such controls would allow the user to enable or disable the various notification alerts and map/globe color displays, set the notification timeframe, select or deselect specific satellites, select the resolution cutoff for alerts, select the type of sensors of interest (Radar and/or Optical), and set the location of interest. The default location of interest may be the user's current location, for example.

Referring now to FIG. 2C, the mobile app 114 may also be configured to display, on a display screen of the user device, descriptions of each satellite, including, by way of example, a rendering of the satellite, manufacturer, operator, and other interesting details about the satellite.

Figure 3B:
FIGS. 3A-3B depict various additional screenshots of a mobile device display screen depicting certain features of one or more embodiments of the invention.
Figure 3A:
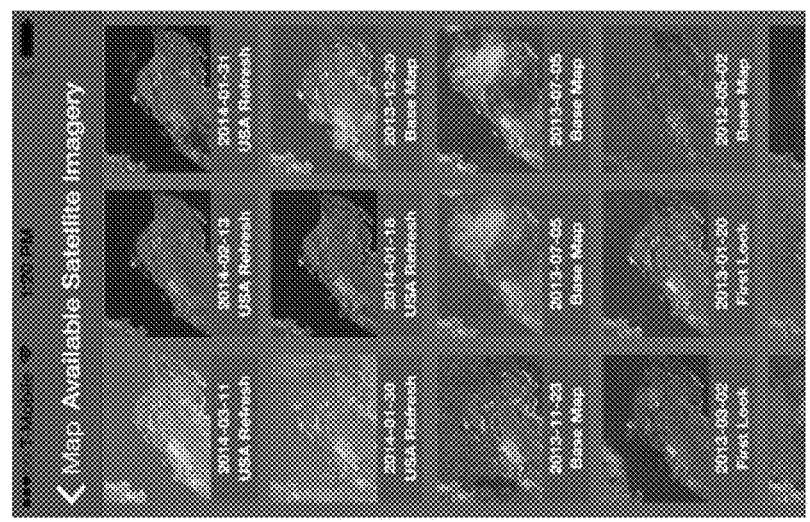

Additionally, the invention may also be configured to provide, by way of a user device display screen, access to preview and purchase archive satellite imagery of the user-specified location, providing iconified versions of all available images with certain high-level information of interest (such as the date the image was taken), an example of which is shown in FIG. 3A. The invention may also provide a user with the ability to select an image of interest, via the user device, to bring up a larger low-resolution preview image, and then to select from various purchase options (such as image size and format), an example of which is shown in FIG. 3B. The user may then proceed to purchase the image (e.g., in high resolution form) using an existing process account or anonymously via in-app purchase or other payment mechanism (e.g., payment system 160). The entire process can be completed in seconds, delivering satellite imagery for any location on demand.

In certain embodiments, users may be able to optionally register for an account with the support server (e.g., server 130). By registering for an account, the user can store images in an online storage (server or private or government clouds), and re-download previously purchased images.

In accordance with the above teachings, the current disclosure differs from known applications and processes in that the principles of the invention, as carried out on a mobile device, enables users to know when satellites can see THEM by applying computations for not only line-of-site visibility, but also based on the basic properties of the satellite imaging systems and the user location conditions, such as lighting. In addition, unlike existing applications used for satellite imaging feasibility and planning by satellite operators, the proposed process provides real-time notifications and alerts to the user to provide situational awareness.

As mentioned above, a connected support server (e.g., server 130) may be configured to provide users with access to relevant satellite imagery for preview and even purchase. The support server may be configured to connect to various commercial (and non-commercial) imagery databases through a variety of protocols (such as WFS and WMS) to discover and retrieve available and appropriately relevant satellite images, and then in turn to provide them to users' mobile devices for display. In certain embodiments, the support server may also act as the purchasing process layer for users wishing to purchase available image(s) by connecting to a payment processor or credit card verification entities (e.g., payment system 160), as appropriate based on the purchase option. The support server may manage user requests for image purchase, list user images, retrieve individual images, and manage user account details. As noted above, such communications are preferably performed using lightweight protocols, such as JSON.

In order to comply with export/trade restrictions or other desired location-based controls, certain process features, such as imagery purchase and/or new tasking purchase features, may be further controlled by the mobile app (enabled/disabled/reduced/enhanced) based on user location or the availability (or lack thereof) of device-based Location Services, or even on the status of user process account registration details in combination with the automated comparison against one or more blacklists, i.e., selected denied parties databases.

Figure 4B:
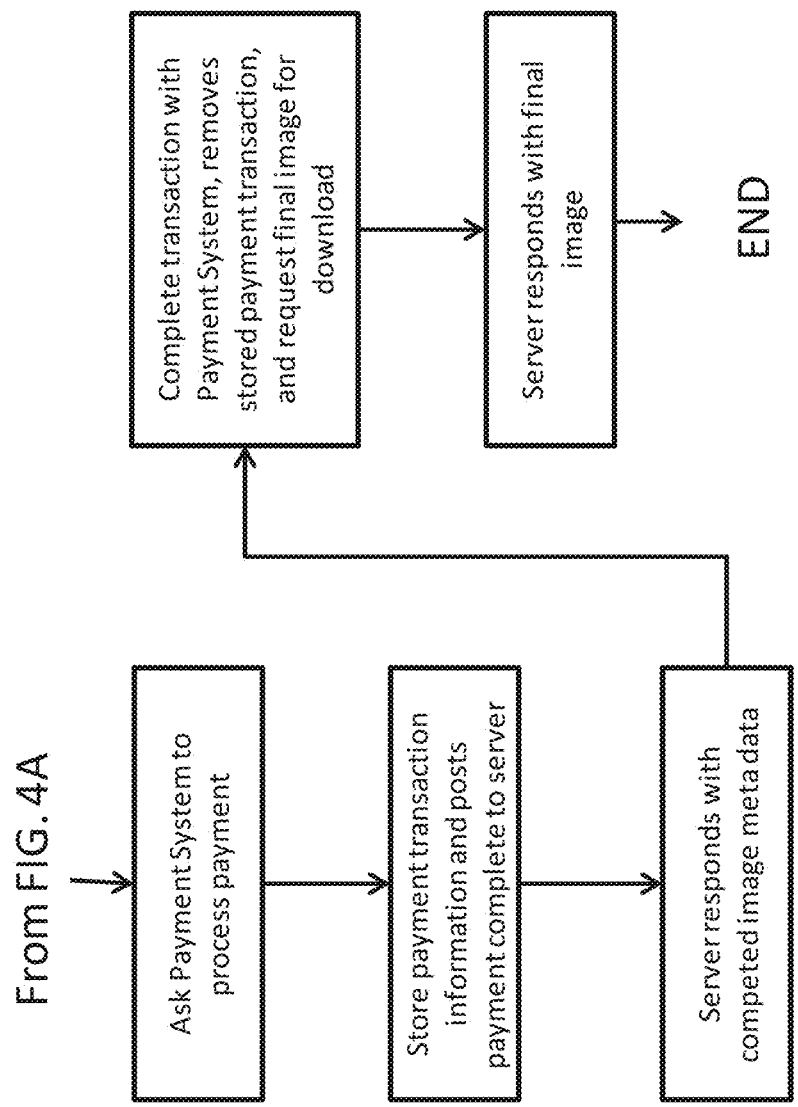

Referring now to FIGS. 4A-4B, depicted is a process for accessing and purchasing location-specific satellite images by a user of the aforementioned mobile application.

Use Example

An example of how a user may interact with a mobile application configured in accordance with the principles of the invention will now be provided. Specifically, after having downloaded and installed the mobile application (e.g., mobile app 114) on a user device (e.g., user device 110), upon launching the mobile app, imaging satellite passes for the user-specified location or the user's current location (based on the smartphone's location services) may be automatically computed. These passes represent future imaging opportunities, which may be displayed on a display screen of the mobile device (e.g., FIG. 2A), where each imaging opportunity represents a time period during which one or more satellites will be capable of capturing satellite imagery of the user-defined location. The user may then close the app, make phone calls, etc.

Some predetermined amount of time later (e.g., five minutes) before each satellite imaging opportunity, the mobile app may be configured to notify the user of the impending satellite imaging opportunity, such as by vibration, sound alert, on-screen alert, etc. The user may then open the mobile app to see the satellite ground track and satellite position during and/or just before the imaging opportunity, and well as optionally having information on the resolution capability of the satellite's imaging sensor and other satellite description information (e.g., FIG. 2C).

Thereafter, the user may then browse through available satellite imagery of their location (e.g., FIG. 3A) and may decide to purchase a recent satellite image of their neighborhood, adding it to their previously-purchased satellite imagery collection within the mobile app. Later, the app may notify the user that a new image of a previously purchased location is available, and the user may then purchase the new image to add to their collection (e.g., using the process of FIGS. 4A-4B). The user, perhaps wanting to get a recent satellite image of another location (his vacation house), may find through the mobile app that no good recent satellite images are available of that location and, as a result, may decide to order new tasking of a satellite. In response, the mobile app may notify the user of the exact moment that the image will be taken, perhaps a few days before so that the user can plan accordingly. The user may gather his family outside their vacation house at the moment the image is to be taken, having everyone smile and wave at the location of the satellite based on the mobile app real-time flyover information. Later, the user will be notified that the image is ready and may be provided a link to download the image from the app server online. The user may then download and disseminate the image, such as by posting it on social media, showing a satellite view of the user's family waving in front of their vacation home.

Figure 5:
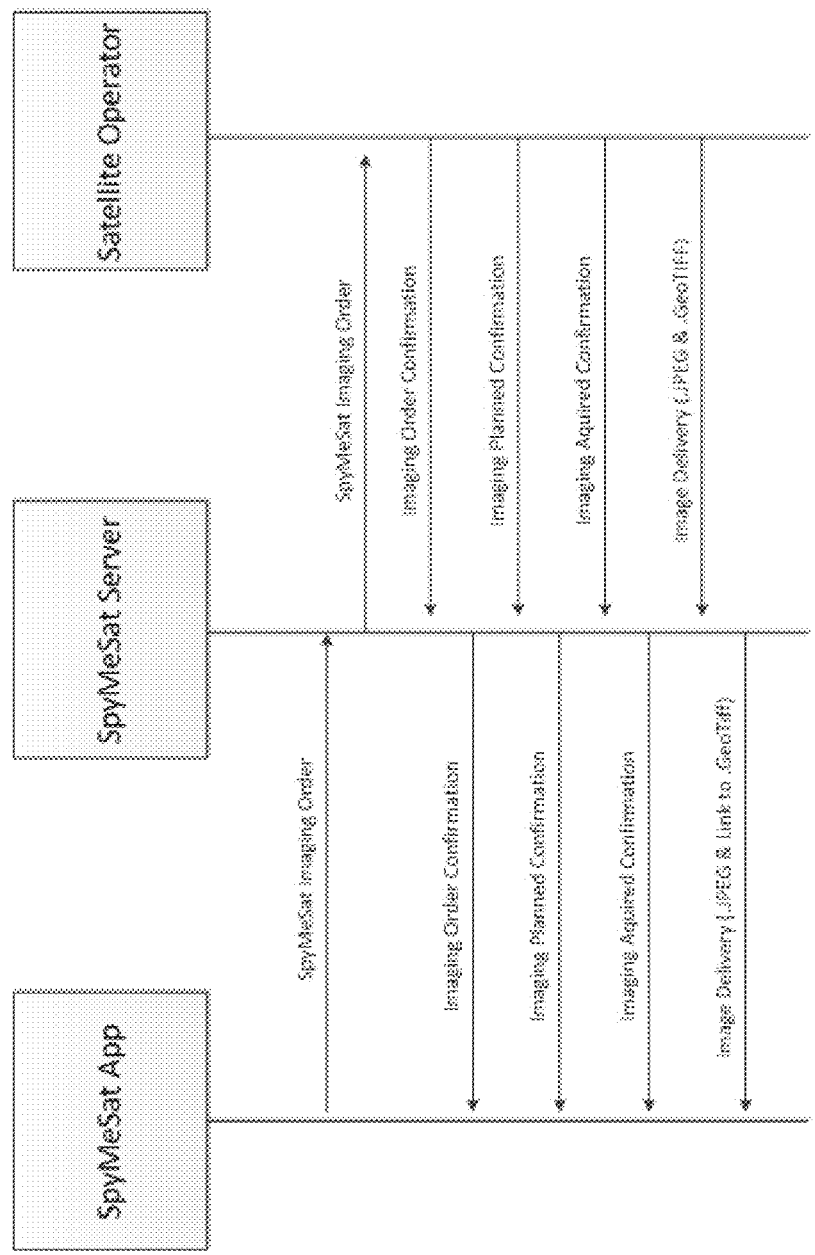
FIG. 5 illustrates a flow diagram of one embodiment of a process by which a mobile device user may request that a satellite capture imagery of a specific location.

In one or more additional embodiments, a mobile app configured in accordance with the principles of the invention may further (i) provide user notifications when a new satellite image is available for a previously purchased location or any user-specified favorite location or special events of general public interest, (ii) provide a mechanism for the mobile device user to order new tasking (e.g. request that a satellite take a new picture of the user location or user-specified location) (e.g., using the process of FIG. 5), and/or (iii) provide an Augmented Reality feature to allow the user to see the real-time satellite positions and other relevant data as an overlay on the mobile device camera view of the real world.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for providing real-time imaging satellite opportunity notifications on a mobile device, the method comprising the acts of:
   receiving, by a user interface of the mobile device, a user image request to capture satellite imagery of a user-defined location;
   transmitting, by the mobile device to a support server over a wireless network connection, information corresponding to the user image request;
   receiving, by the mobile device from the support server over the wireless network connection, satellite state information corresponding to one or more satellites;
   calculating, by the mobile device using the satellite state information, one or more time periods during which the one or more satellites will be capable of capturing satellite imagery of the user-defined location;
   providing, by the mobile device, a real-time user notification corresponding to at least one of the calculated one or more time periods during which the one or more satellites will be capable of capturing satellite imagery of the user-defined location; and
   determining real-time imaging resolution capabilities for the one or more satellites;
   displaying, on a display of the mobile device, said determined real-time imaging resolution capabilities.

2. The method of claim 1, wherein the user-defined location is a current location of the mobile device.

3. The method of claim 1, wherein said calculating, by the mobile device using the satellite state information, the one or more time periods further takes into account lighting conditions at the user-defined location.

4. The method of claim 1, wherein said calculating, by the mobile device using the satellite state information, the one or more time periods further takes into atmospheric conditions at the user-defined location.

5. The method of claim 1, wherein providing the user notification comprises displaying the user notification on a display screen of the mobile device.

6. The method of claim 1, wherein providing the user notification comprises displaying the user notification on a display screen of a secondary electronic device that is in communication with the mobile device.

7. The method of claim 1, further comprising displaying, on a display screen of the mobile device, a plurality of start times and stop times corresponding to each of the calculated one or more time periods during which the one or more satellites will be capable of capturing satellite imagery of the user-defined location.

8. The method of claim 1, further comprising displaying a graphical representation of real-time positions corresponding to the one or more satellites.

9. The method of claim 1, further comprising receiving, by the user interface of the mobile device, a new tasking request provided by the user, wherein the new tasking request corresponds to a request to task one or more satellites to capture imagery corresponding to the user-defined location.

10. A method for providing real-time imaging satellite opportunity notifications on a mobile device, the method comprising the acts of:
receiving, by a user interface of the mobile device, a user image request to capture satellite imagery of a user-defined location;
transmitting, by the mobile device to a support server over a wireless network connection, information corresponding to the user image request;
receiving, by the mobile device from the support server over the wireless network connection, satellite state information corresponding to one or more satellites;
calculating, by the mobile device using the satellite state information, one or more time periods during which the one or more satellites will be capable of capturing satellite imagery of the user-defined location;
providing, by the mobile device, a real-time user notification corresponding to at least one of the calculated one or more time periods during which the one or more satellites will be capable of capturing satellite imagery of the user-defined location;
receiving, by the mobile device from the support server, a low resolution preview image in response to the user image request; and
displaying, on a display screen of the mobile device, the low resolution preview image.

11. The method of claim 10, further comprising:
receiving, by the mobile device, a user purchase request corresponding to the low resolution preview image;
transmitting, by the mobile device to the support server, the user purchase request; and
receiving, by the mobile device from the support server, satellite imagery corresponding to the user-defined location.

12. The method of claim 1, further comprising:
transmitting, by the mobile device to the support server, a user tasking request to corresponding to a desired new satellite imagery;
receiving, by the mobile device from the support server, a tasking request confirmation, based on information received from a satellite operator;
receiving, by the mobile device from the support server, an imaging planned confirmation corresponding to a time period during which the desired new satellite imagery is expected to be captured; and
receiving, by the mobile device from the support server, the desired new satellite imagery based on imagery received from the satellite operator.

13. A method for providing real-time imaging satellite opportunity notifications on a mobile device, the method comprising the acts of:
receiving, by a user interface of the mobile device, a user image request to capture satellite imagery of a user-defined location;
transmitting, by the mobile device to a support server over a wireless network connection, information corresponding to the user image request;
receiving, by the mobile device from the support server over the wireless network connection, satellite state information corresponding to one or more satellites;
calculating, by the mobile device using the satellite state information, one or more time periods during which the one or more satellites will be capable of capturing satellite imagery of the user-defined location;
providing, by the mobile device, a real-time user notification corresponding to at least one of the calculated one or more time periods during which the one or more satellites will be capable of capturing satellite imagery of the user-defined location; and
determining real-time imaging resolution capabilities for the one or more satellites;
displaying, on a display of the mobile device, said determined real-time imaging resolution capabilities;
receiving, by the mobile device from the support server, a low resolution preview image in response to the user image request; and
displaying, on the display screen of the mobile device, the low resolution preview image.

14. The method of claim 13, further comprising:
receiving, by the mobile device, a user purchase request corresponding to the low resolution preview image;
transmitting, by the mobile device to the support server, the user purchase request; and
receiving, by the mobile device from the support server, satellite imagery corresponding to the user-defined location.

15. The method of claim 13, further comprising:
transmitting, by the mobile device to the support server, a user tasking request to corresponding to a desired new satellite imagery;
receiving, by the mobile device from the support server, a tasking request confirmation, based on information received from a satellite operator;
receiving, by the mobile device from the support server, an imaging planned confirmation corresponding to a time period during which the desired new satellite imagery is expected to be captured; and
receiving, by the mobile device from the support server, the desired new satellite imagery based on imagery received from the satellite operator.

16. The method of claim 1, further comprising automatically providing a further user notification in response to new satellite imagery being available which corresponds to at least one of a location for which satellite imagery had been previously been purchased by a user, a user-specified favorite location, or a location of a an event of general public interest.

17. The method of claim 10, further comprising automatically providing a further user notification in response to new satellite imagery being available which corresponds to at least one of a location for which satellite imagery had been previously been purchased by a user, a user-specified favorite location, or a location of a an event of general public interest.

* * * * *